United States Patent Office 2,943,106
Patented June 28, 1960

2,943,106

3,4-DICHLOROBENZYLISOTHIOCYANATE

Arthur F. McKay, Beaconsfield, Quebec, and David L. Garmaise, Montreal, Quebec, Canada, assignors to Monsanto Canada Limited, Ville la Salle, Quebec, Canada No Drawing. Filed Feb. 24, 1958, Ser. No. 716,844

1 Claim. (Cl. 260—454)

This invention relates to 3,4-dichlorobenzylisothiocyanate as a bacteriostat.

B. R. Das, P. A. Kurup and P. L. Narasimha Rao, Naturwissenschaften, 41 66 (1954) and Chem. Abstract 48, 11540[a] (1954) shows that benzylisothiocyanate is a bacteriostat. The 3,4-dichlorobenzylisothiocyanate of the invention is much more active than benzylisothiocyanate.

A procedure for preparing organic isothiocyanates generally is described by J. E. Hodgkins and M. E. Ettlinger, J. Org. Chem. 21, 404 (1956). The present application describes a different and simplified procedure for arriving at the specific benzylisothiocyanates of the invention.

A preferred method according to the invention is to treat 3,4-dichloro benzylamine with carbon disulfide in an inert solvent, preferably a chlorinated solvent. Solvents which may be employed are, for example, carbon tetrachloride, chlorobenzene, methylene chloride, chloroform, benzene, dioxane and ether. Methylene chloride and chloroform are preferred solvents. The reaction is preferably conducted in the presence of one mole equivalent of a low boiling tertiary aliphatic amine, for example, triethylamine, triisopropylamine or tri-n-butylamine, at a temperature preferably in the range from about —10° C. to about +20° C.

When the formation of the dithiocarbamate salt is complete, one mole equivalent of ethyl chloroformate is added, preferably at a temperature within the range from about —10° C. to about 0° C. to form a carbethoxy 3,4-dichlorodithiocarbamate. The latter is thereby decomposed by the addition of a base, for example, a low boiling tertiary aliphatic amine, preferably triethylamine, at a temperature within the range from about 0° C. to about +25° C. The resulting solution, after extraction with aqueous acid and aqueous alkali, is fractionally distilled to obtain the pure substituted benzylisothiocyanate.

3,4-dichlorobenzylisothiocyanate is an effective bacteriostat. It is particularly active in inhibiting the growth of *Staphylococcus pyogenes* (R) and (S), *Sarcina lutea*, and *Strept. faecalis*. It inhibits the growth of *Staph. pyogenes* (R) at a dilution of 1:5,000,000. It also inhibits the growth of *E. coli* No. 198, *Aero. aerogenes*, *Ps. aeruginosa*, *Proteus mirabilis* and *Proteus vulgaris* at relatively high dilution. The two Proteus organisms are inhibited at a dilution of 1:640,000.

EXAMPLE I

*2-chlorobenzylisothiocyanate*

A solution of carbon disulfide (5.9 parts) in chloroform (45 parts) was added dropwise with stirring to a solution of 2-chlorobenzylamine (10.0 parts) and triethylamine (7.2 parts) in 30 parts methylenedichloride. The addition period was thirty minutes and the temperature was maintained at —10° C. The cooling bath was removed and the solution was stirred at room temperature for 20 minutes. A solution of ethyl chloroformate (7.7 parts) in 45 parts chloroform was added dropwise over a period of 30 minutes at —10° C. The solution was stirred at room temperature for 20 minutes. A solution of triethylamine (7.2 parts) in 40 parts chloroform was added at room temperature and the solution was allowed to stand for one hour. Chloroform (150 parts) was added, and the solution was washed with 4% sulfuric acid (3×50 parts), 2% sodium hydroxide solution (3×50 parts) and water (3×50 parts). Fractional distillation of the chloroform solution afforded 2-chlorobenzylisothiocyanate (10.3 parts: 79.2% yield) as a colorless liquid, B.P. 94–98° C./0.23 mm., $n_D^{25}$ 1.60914, $D_4^{20}$ 1.282. Analysis of the new compound gave 52.32% carbon, 3.45% hydrogen, and 8.07% nitrogen, as compared with the theoretical calculated for $C_8H_6NClS$ of 52.32% carbon, 3.29% hydrogen and 7.63% nitrogen.

EXAMPLE II

*3,4-dichlorobenzylisothiocyanate*

3,4-dichlorobenzylamine was converted by the procedure outlined in Example I to 3,4-dichlorobenzylisothiocyanate, (B.P. 124–128° C./0.37 mm., $n_D^{25}$ 1.62150, $D_4^{20}$ 1.409) yield 79.6%. Analysis of the new compound gave 44.12% carbon, 2.33% hydrogen and 6.79% nitrogen as compared with the theoretical calculated for $C_8H_5NCl_2S$ of 44.04% carbon, 2.31% hydrogen and 6.43% nitrogen.

We claim:

3,4-dichlorobenzylisothiocyanate.

References Cited in the file of this patent

UNITED STATES PATENTS 2,029,959    Urbain _____ Feb. 4, 1936

OTHER REFERENCES

Kurup et al.: Chemical Abstracts, vol. 48, page 11540 (1954). Nischk: (Germany, Farben), F16476 IVb/120, September 27, 1956 (3 pages).